United States Patent Office 3,833,560
Patented Sept. 3, 1974

3,833,560
IMPROVEMENT IN THE PROCESS FOR REARRANGEMENT OF KETOXIMES BY USING ADHESION RESISTANT PARTIALLY NITRIDED BORIC ACID CATALYSTS
Otto Immel, Krefeld-Uerdingen, and Hans-Helmut Schwarz, Krefeld, Germany, assignors to Bayer Aktiengesellschaft, Leverkusen, Germany
No Drawing. Original application Oct. 9, 1969, Ser. No. 865,194, now abandoned. Divided and this application Aug. 9, 1971, Ser. No. 170,276
Claims priority, application Germany, Oct. 12, 1968, P 18 02 887.0
The portion of the term of the patent subsequent to Apr. 6, 1988 has been disclaimed
Int. Cl. C07d 41/06
U.S. Cl. 260—239.3 A    5 Claims

ABSTRACT OF THE DISCLOSURE

The process of rearranging cyclic ketoximes in the gaseous phase in the presence of boric acid catalyst to the corresponding lactams is improved by using the boric acid catalysts which are more abrasion resistant by partially nitriding the catalyst with a nitrogen-containing material e.g. ammonia urea.

---

This application is a division of copending application, Ser. No. 865,194, filed Oct. 9, 1969, now abandoned.

The invention relates to a process for the production of abrasion-resistant catalysts containing boric acid suitable for the rearrangement of ketoximes wherein the catalysts are heated together with nitrogen-containing compounds.

It is known that oximes of cyclic ketones, cyclohexanone oxime in particular, can be rearranged to form the corresponding lactams in the gas phase at 250 to 360° C. on catalysts containing boric acid. Aluminium oxide, titanium dioxide, tin dioxide, calcium phosphate or carbon black, for example, is used as supporting material for the boric acid.

The rearrangement reaction is carried out in a fixed bed or fluidised bed, optionally in the presence of a carrier gas and optionally in the presence of steam, either at normal pressure or at reduced pressure. Since the reaction is highly exothermic, it is difficult with fixed catalysts to obtain an uniform temperature distribution so that it is preferred in practice to employ the fluidised bed principle.

Despite their high catalytic activity, however, conventional catalysts containing boric acid show mechanical deficiencies, especially when they are used for the rearrangement of oximes in a fluidised bed. Due to incessant movement in the fluidised bed, the catalyst particles disintegrate and the finer particles formed are entrained by the gas. This loss has to be compensated by the addition of fresh catalyst.

It is an object of this invention to provide a process for the production of catalysts containing boric acid which show outstanding mechanical strength and which suffer smaller losses through abrasion than conventional catalysts containing boric acid.

This object is accomplished by a process for the production of abrasion-resistant catalysts containing boric acid suitable for the rearrangement of ketoximes, which comprises heating a mixture of boric acid and supporting material together with a nitrogen-containing compound which forms boron nitride with boric acid or boron trioxide, said heating being effected at a temperature of from 250 to 900 ° C.

As the nitrogen-containing compounds forming boron nitride with compounds of boron, for example $NH_4OH$, $(NH_4)_2CO_3$, $NH_4Cl$, urea, thiourea or guanidine, are additionally worked into a mixture of boric acid and supporting material during preparation of the catalyst. The quantities in which these additives can be used may vary within wide limits and are governed by the type of supporting material, although an addition of from 1 to 30% by weight, based on the weight of boric acid plus supporting material, has proved to be effective. Preferably 1 to 10% by weight are added. The mechanical strength of catalysts containing boric acid is improved by the process according to the invention without any effect whatever upon their catalytic activity.

The rearrangement reaction employing the catalyst according to the invention can be carried out at 200 to 400° C. and preferably at 270 to 360° C., either at normal pressure or at reduced pressure, in the presence of steam and optionally in the presence of a carrier gas.

Oximes of cyclic ketones containing from 5 to 12 carbon atoms in the ring lend themselves particularly well to rearrangement, for exmaple cyclopentanone oxime, cyclohexanone oxime, cycloheptanone oxime, cyclooctanone oxime, cyclododecanone oxime and methyl cyclohexanone oxime.

To prepare the catalyst, boric acid and the supporting material, for example titanium dioxide, calcium, phosphate or carbon black, are thoroughly mixed and made into a paste with an aqueous solution of the nitrogen-containing compound, for example urea or ammonia. The mass thus formed is dried, heated at 250 to 900° C. and then size-reduced. It is also possible to bring the catalyst material into a predetermined form before heat treatment, for example by pelletising or by extrusion.

The following examples are to further illustrate the invention without limiting it.

Examples 1 to 10

The following Table shows Examples comparing the abrasion resistance of different boric acid-containing catalysts with and without additions of $NH_4OH$, urea, guanidine carbonate and thiourea. The second column of the Table shows the starting mixture of boric acid and supporting material, and the third column shows the type and quantity of additive promoting solidification of the catalyst. To prepare the catalysts, boric acid and supporting material were mixed in a kneader, after which the additive (e.g. urea) was introduced in the form of an aqueous solution and a paste prepared. This paste was dried at 120° C. and then heat-treated for 3 hours at 700 to 800° C. (Examples 1 and 2) and for 3 hours at 580° C. (Examples 3 to 10).

The catalyst composition thus obtained was ground and those grains from 0.1 to 0.5 mm. in diameter were separated. To determine abrasion, catalyst samples each of 50 g. were kept for 200 hours in a state of turbulent fluidisation over a frit in a glass tube 5 cm. wide. The catalyst samples were then graded through a 0.1 mm. wide mesh screen to separate the fine component formed as a result of friction and the residue was weighed. The difference between the weight of the residue and the initial weight is a measure of the abrasion and is expressed in percent (cf. Table, column 4). In other words, in all the comparison tests the additives bring about a considerable reduction in abrasion.

In order to demonstrate the catalytic activity of the catalysts according to the invention, a rearrangement reaction involving cyclohexanone oxime was carried out with 10 g. of the catalyst of Example 10.

For this purpose, 14.5 g. per hour of cyclohexanone oxime, containing 4% by weight of water, and 60 litres per hour of nitrogen were passed over the catalyst sample at a temperature of from 330 to 350° C. The reaction product collected over a period of 6 hours contained 98% of caprolactam and 2% of secondary products.

TABLE

| Example | Catalyst mixture | Additives | Abrasion in percent by weight |
|---|---|---|---|
| 1 | 300 g. $Ca_3(PO_4)_2$ +300 g. $H_3BO_3$. | | 15.2 |
| 2 | 230 g. $Ca_3(PO_4)_2$ +230 g. $H_3BO_3$. | 50 g. urea | 5.4 |
| 3 | 600 g. $TiO_2$ (anatase) +150 g. $H_3BO_3$. | | 8.2 |
| 4 | 600 g. $TiO_2$ (anatase) +150 g. $H_3BO_3$. | 50 g. urea | 2. |
| 5 | 160 g. carbon black +240 g. $H_3BO_3$. | | 2.4 |
| 6 | 160 g. carbon black +240 g. $H_3BO_3$. | 30 g. urea | 1.8 |
| 7 | 160 g. carbon black +240 g. $H_3BO_3$. | 220 g. 12% by weight $NH_3$-solution. | 1.0 |
| 8 | 180 g. carbon black +220 g. $H_3BO_3$. | | 10.0 |
| 9 | 180 g. carbon black +220 g. $H_3BO_3$. | 50 g. guanidine carbonate. | 2.0 |
| 10 | 180 g. carbon black +220 g. $H_3BO_3$. | 50 g. thiourea | 1.6 |

What we claim is:

1. In the process for the production of lactams by the rearrangement of cyclic ketoxime having 5 to 12 carbon atoms in the ring in the gaseous phase at a temperature of 200° C. to 400° C. in the presence of a catalyst containing boric acid, the improvement which comprises using as said catalyst a material containing boric acid and boron nitride obtained by heating at a temperature of 250° C. to 900° C.,
   (A) a mixture of boric acid and a supporting material; and
   (B) 1–30% by weight based on A of a nitrogen-containing compound which forms boron nitride with boric acid or boron trioxide, selected from the group consisting of $NH_4OH$, $(NH_4)_2CO_3$, $NH_4Cl$, urea, guanidine and thiourea.

2. The process of Claim 1 wherein said nitrogen-containing compound (B) is employed in an amount of 1–10% of (A).

3. The process of Claim 1 wherein the weight ratio of boric acid and supporting material is from 1:4 to 3:2.

4. The process of Claim 1 in which said nitrogen-containing compound (B) is $NH_4OH$.

5. The process of Claim 1 in which said nitrogen-containing compound (B) is urea.

References Cited

UNITED STATES PATENTS 3,574,193   4/1971   Immel et al. _____ 260—239.3 A

FOREIGN PATENTS 874,165   8/1961   Great Britain.
874,166   8/1961   Great Britain.

OTHER REFERENCES

O'Connor, "J. Am. Chem. Soc.," vol. 84, pages 1253–4 (1962).

HENRY R. JILES, Primary Examiner

R. T. BOND, Assistant Examiner

U.S. Cl. X.R.

260—293, 86; 252—432